Aug. 24, 1965 A. REISMAN ETAL 3,202,609

HIGH MOBILITY PHOTOCONDUCTOR SINTERED SHAPES AND PROCESS FOR THEIR PREPARATION

Filed Jan. 31, 1962

INVENTORS
MELVIN BERKENBLIT
GEORGE CHEROFF
FREDERICK HOCHBERG
ARNOLD REISMAN

BY [signature]

ATTORNEY 3,202,609

HIGH MOBILITY PHOTOCONDUCTOR SINTERED SHAPES AND PROCESS FOR THEIR PREPARATION

Arnold Reisman and Melvin Berkenblit, Yorktown Heights, and George Cheroff and Frederick Hochberg, Peekskill, N.Y., assignors to International Business Machines Corporation, New York, N.Y., a corporation of New York Filed Jan. 31, 1962, Ser. No. 170,015
2 Claims. (Cl. 252—501)

This process relates to the preparation of photoconductor sintered shapes. More particularly, it relates to the preparation of high effective mobility cadmium selenide sintered shapes without the use of a flux material or substrates. These cadmium selenide sintered shapes exhibit effective mobilities many times greater than observed heretofore in fluxed cadmium selenide sintered layers.

Cadmium selenide sintered shapes that are self supporting and have not been sintered via a fluxing operation were previously unavailable. Electrical devices prepared from cadmium selenide have previously been made by sintering the CdSe in the presence of a flux on a substrate. Such sintered CdSe photoconductors will generally exhibit effective mobilities in the range 80–100 $cm.^2$/volt sec. A photoconductor ideally should exhibit a maximum sensitivity (ratio of dark/light resistance) and a minimum time for decay from a given light resistance value to some arbitrarily chosen dark resistance value. These two numbers are related to the effective mobility, that is the greater the mobility, the smaller the decay time and the more sensitive the material. In addition, the requirement in the past for the incorporation of a supporting substrate in the fluxed sintering of a photoconductor layer has placed certain limitations on the geometries of a fabricated device and has limited the temperature range over which a photoconductor can be fabricated because of impurity contamination via reaction of the flux and the substrate with ultimate incorporation of these impurities in the sintered layer.

The process of the invention prepares cadimum selenide sintered shapes which exhibit effective mobilities many times greater than those heretofore observed in fluxed sintered layers. In addition the sintered shapes are self supporting enabling the affixing of electrical contacts to any of the surfaces of the sintered shapes rather than to the single exposed surface of a fluxed sintered layer.

It is an object of the invention to provide a process for preparing photoconductors of high effective mobility.

It is another object of the invention to prepare cadmium selenide sintered shapes which are self supporting.

It is a further object of the invention to prepare sintered cadmium selenide shapes of high effective mobility and such that the sintered shapes are self supporting and have all their surfaces available for affixing electrical contacts.

Another object of the invention is to prepare cadmium selenide photoconductor material with high effective mobilities many times greater than those observed in fluxed sintered layers and which are self supporting.

The foregoing and other objects, features, and advantages of the invention will be apparent from the following more particular description of a proven embodiment of the invention, as illustrateed in the accompanying drawing.

Figure 1:
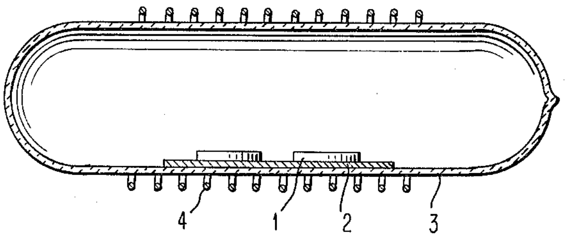
FIGURE 1 is a view, partly in cross section of the sealed evacuated apparatus used in the equilibrium sintering step of the process showing the compressed CdSe bodies on the alumina slab.
Figure 2:
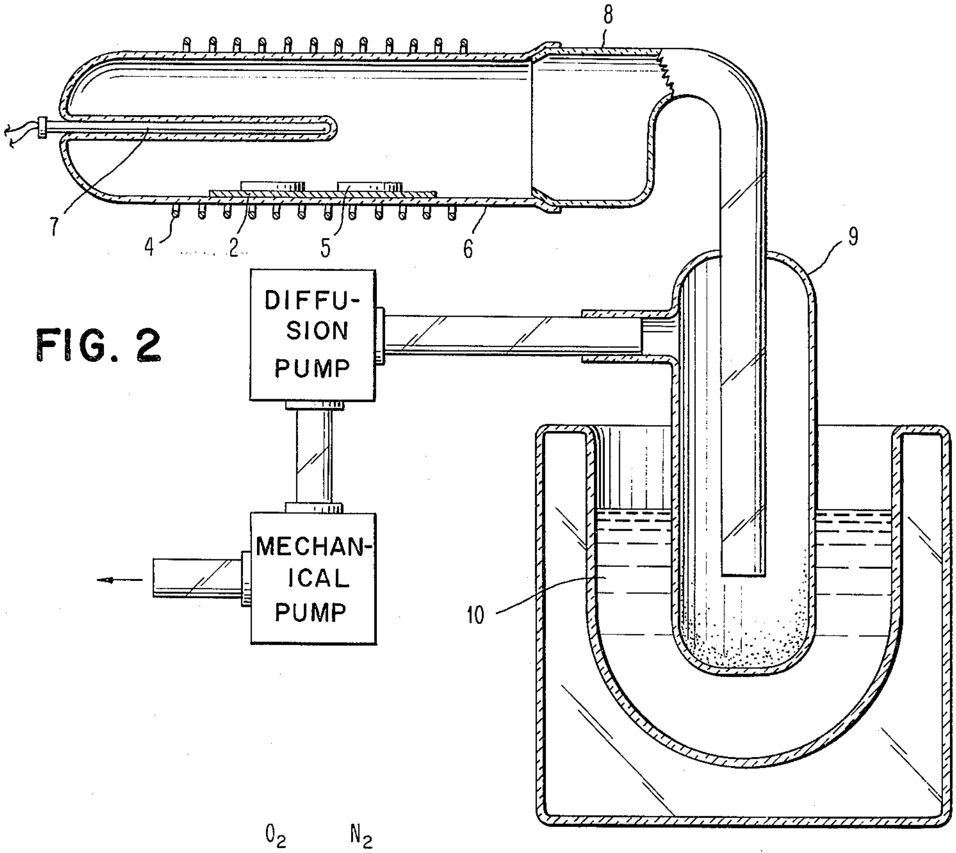
FIGURE 2 is a view, partly in cross section, of the open constantly evacuated apparatus system used in the steady state sintering step of the process showing the compressed CdSe bodies on the alumina slab.
Figure 3:
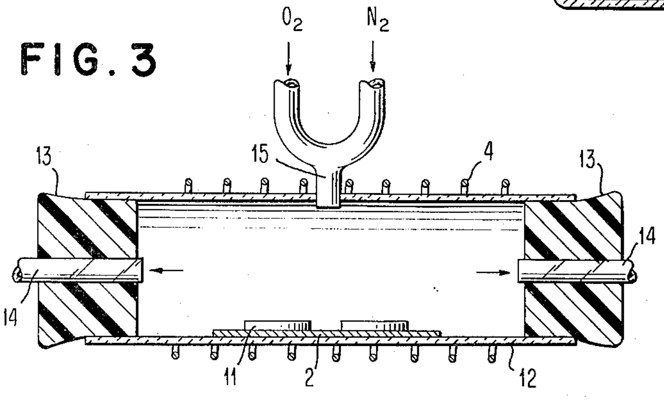
FIGURE 3 is a view partly in cross section, of the apparatus used in the ambient atmosphere equilibrium firing of the process showing the compressed CdSe bodies on the alumina slab.

Cadmium selenide photoconductor sintered shapes exhibit an effective mobility which is many times greater than the effective mobility of fluxed cadmium selenide sintered layers and are highly desired for use in photoconductor devices. The effective mobility of a photoconductor device is a parameter which is related to two measurable quantities, sensitivity and speed. This parameter is a figure of merit used in judging the effectiveness of the photoconductor device when it is to be used in logical functions in circuit applications. The relationship of speed and sensitivity to effective mobility of a photoconductor device is expressed in Equation I.

$$u_d = \frac{\left(\frac{dG}{dt}\right)t \rightarrow o(E_g)}{I_0\left(\frac{w}{l}\right)} \qquad \text{(Equation I)}$$

where $E_g$ is the energy gap of the material in electron volts, $I_0$ is the light intensity in watts per square centimeter, $$\frac{dG}{dt}$$

equals the initial slope of the decay curve conductance (G) versus time ($t$), $w$ is electrode gap, $l$ is electrode length, and $u_d$ is effective mobility expressed in $cm.^2$/volt sec. The term $$\frac{dG}{dt}$$

specifically contains the quantities decay time and sensitivity (which is measured as conductance). The remaining quantities are all constants for a given set of conditions. Thus, a smaller decay time, coupled with a more sensitive material results in a greater effective mobility.

The polycrystalline cadmium selenide powder used in the process of the invention must be analytically stoichiometric, stoichiometric within the limits set by wet chemical and X-ray analysis, but preferably should exhibit the proper deviation from stoichiometry commensurate with the sintering temperature used in the fabrication of the photoconductor element.

The process of the invention can best be described as follows:

A suitable impurity, such as for example copper—added as copper chloride ($CuCl_2$), is mixed with cadmium selenide polycrystalline powder. The powder is then pressed into any desired shape (for example a disc or pellet) at pressures from 25,000 to 100,000 lbs. per square inch.

The pressed shapes of cadmium selenide 1 are placed on a slab (which may be alumina or quartz or other suitable inert material depending upon the temperature to which it will be subjected) and the slab placed in a quartz tube 3 which is impervious to cadmium selenide and cadmium and selenium vapors. The tube is evacuated to a pressure from 1 to $7\times10^{-6}$ mm. of mercury and then sealed. The sealed tube is then heated (e.g. by a heating coil 4) at from 700° to 1100° C. for several hours (1–8 hours), cooled to room temperature and broken open to remove the slab and cadmium selenide shapes. This initial sintering step in a closed evacuated tube is hereby defined as the equilibrium sintering step of the process.

Subsequent to this step the slab 2 containing the CdSe shapes 5 are now placed in a quartz furnace tube 6 which is impervious to cadmium selenide and cadmium and selenium vapors. It contains a thermocouple well 7 for monitoring the temperature. The furnace tube of quartz is sealed at one end and open to a vacuum system at the other.

A heating coil element 4 encompasses the furnace tube in the region in which the slab with the CdSe shapes to be heated are located. There is a joint 8 which is used to connect the furnace tube to a cold trap 9 cooled by liquid $N_2$ 10 which protects the vacuum systems by collecting any low vapor fractions. The vacuum system comprises a diffusion pump and a mechanical (fore) pump. The fore pump reduces the pressure to a low range and the diffusion pump takes it down to the ultimate vacuum range.

The furnace tube 6 is continuously evacuated to a pressure of 1–$7\times10^{-6}$ mm. of mercury for 1–5 hours at 500°–600° C. The slab and CdSe shapes are then cooled to room temperature. This process step of heating in an open evacuated system is hereby designated as steady state sintering.

The next process step is $O_2$-$N_2$ atmosphere equilibration heat treatment. This step involves heating the sintered CdSe shapes on the slab in a 1% $O_2$-99% $N_2$ atmosphere at 1 atmosphere pressure for 1–5 hours at 535° C. The slab 2 with the sintered CdSe shapes 1 are placed in a quartz tube 12 which is sealed at both ends with plugs 13 made of tetrafluoroethylene (Teflon) through which a tube 14 is placed for effluent flow of the $O_2$-$N_2$ gas mixture. The $O_2$ and $N_2$ are introduced into the tube by means of a "Y" shaped tube 15 located above the slab containing the CdSe sintered shapes. A heating coil 4 encompasses the tube.

The quartz tubes used in any of the process steps may be of any diameter or any shape, but preferably tubes are used which are commensurate with the quantity of material which is to be treated.

The sintered shapes are then cooled down and electroded. The effective mobility can vary from 700 to 50,000 cm.²/volt sec. These electroded shapes can be utilized as the photoconductor element in light sensing circuits or as optical relays. When said relays are combined in various arrays they can be used to perform logical functions in computer circuitry.

EXAMPLE 1

2 g. of analytically stoichiometric CdSe 400 mesh polycrystalline powder is admixed with .0063 g. of $CuCl_2$ dissolved in triple distilled water after which the powder is dried at 110° for 2 hours. The 2 g. of analytically stoichiometric 400 mesh CdSe polycrystalline powder is admixed with sufficient Cu present as $CuCl_2$ to give a material containing 175 mm. of Cu by weight. The dried powder is completely mixed in a ball mill and pressed into a circular disc shape at 75,000 lbs./square inch. The disc is placed on an alumina slab and the slab is sealed into an evacuated quartz tube at $7\times10^{-6}$ mm. of Hg. This tube is heated at 900° C. for 2 hours. After the equilibrium sintering is completed the tube is cooled to room temperature and broken open. Next the discs and slab are subjected to steady state sintering at 600° C. for 2 hours in a continuous vacuum at a pressure of $7\times10^{-6}$ mm. of Hg and cooled again to room temperature. Subsequently, the $O_2$–$N_2$ atmosphere equilibration takes place in a 1% $O_2$-99% $N_2$ atmosphere at 535° C. for 2 hours. After cooling the shapes are electroded and exhibit effective mobilities of 20,000 cm.²/volt sec. A sintered layer prepared by fluxing techniques from the same starting material yielded an effective mobility of 105 cm.²/volt sec.

EXAMPLES 2–6

The procedure of Example 1 is repeated except the process parameters are varied as indicated below in Table I.

*Table I*

| Ex. No. | Compacting pressure (lb./in.²) | Equilibrium sintering (closed vacuum system) | | Pressure (mm. of Hg) | Steady state sintering (open vacuum system) | | Pressure (mm. of Hg) | $O_2$-$N_2$ Atmosphere Equilibration | | Effective mobility of sintered shapes (cm.²/volt sec.) | Effective mobility of fluxed sintered layers (cm.²/volt sec.) |
|---|---|---|---|---|---|---|---|---|---|---|---|
| | | Temp. (° C.) | Time (hr.) | | Temp. (° C.) | Time (hr.) | | 1% $O_2$-99% $N_2$ Temperature (° C.) | Gas mixture system Time (hr.) | | |
| 2 | 25,000 | 900 | 2 | $1\times10^{-6}$ | 535 | 1 | $3\times10^{-6}$ | 535 | 1 | 3,000 | 80 |
| 3 | 90,000 | 800 | 2 | $4\times10^{-6}$ | 600 | 3 | $1\times10^{-6}$ | 535 | 3 | 700 | 60 |
| 4 | 60,000 | 1,100 | 1 | $3\times10^{-6}$ | 575 | 2 | $2\times10^{-6}$ | 535 | 2 | 50,000 | 110 |
| 5 | 75,000 | 700 | 8 | $7\times10^{-6}$ | 600 | 5 | $7\times10^{-6}$ | 535 | 4 | 16,000 | 95 |
| 6 | 100,000 | 1,000 | 3 | $1\times10^{-6}$ | 500 | 3 | $4\times10^{-6}$ | 535 | 5 | 12,000 | 115 |

The CdSe sintered shapes prepared according to the process of the invention may be used as active components in performing logical functions in computer circuits.

The process of the invention discloses the preparation of high mobility polycrystalline cadmium selenide sintered shapes. It involves the introduction into CdSe of copper as a dopant for example by means of $CuCl_2$. The powdered mixture is pressed into shapes, sealed in quartz and subjected to equilibrium sintering. The shapes are then subjected to steady state sintering at a lower temperature in a continuous vacuum. Next $O_2$-$N_2$ atmosphere equilibration heat treatment is conducted at a still lower temperature. The shapes are cooled and then electroded. Effective device mobilities for these sintered shapes are observed to be many times greater than those observed in fluxed sintered layers prepared from the same copper doped level of cadmium selenide.

While the invention has been particularly shown and described with reference to a preferred embodiment thereof, it will be understood by those skilled in the art that various changes in form and details may be made therein without departing from the spirit and scope of the invention.

What is claimed is:

1. Cadmium selenide photoconductor sintered disc shapes having a high effective mobility of about 700–50,000 cm.²/volt sec. prepared by process which comprises:

(1) mixing cadmium selenide polycrystalline powder with sufficient copper as in solution to yield a material containing 100 to 400 parts per million of the copper by weight;

(2) pressing the doped cadmium selenide powder into disc shapes at a pressure from 25,000 to 100,000 pounds per square inch;

(3) equilibrium sintering the pressed discs at a temperature between 700°–1100° C. for from 1 hour to 8 hours in a vacuum at a pressure from $1-7\times10^{-6}$ mm. of mercury;

(4) then steady state sintering these discs at a temperature of 500°–600° C. for 1 to 5 hours in a vacuum at a pressure from $1-7\times10^{-6}$ mm. of mercury;

(5) now subjecting the sintered discs to oxygen-nitrogen atmosphere equilibration heat treatment at 535° C. for 1 to 5 hours in an atmosphere of 1% oxygen and 99% nitrogen at one atmosphere of pressure;

(6) and then subsequently air quenching the sintered shapes to room temperature.

2. A process of preparing cadmium selenide photoconductor sintered shapes having high effective mobility of about 700–50,000 cm.$^2$/volt sec. which are self supporting and have all surfaces available for affixing electrical contacts which process comprises:

(1) mixing cadmium selenide polycrystalline powder with sufficient copper present as copper chloride in solution to yield a material containing 100 to 400 parts per million of copper by weight;

(2) pressing the mixture thus obtained into desired shapes at a pressure from 25,000 to 100,000 pounds per square inch;

(3) equilibrium sintering the pressed shapes at a temperature between 700°–1100° C. for from 1 hour to 8 hours in a vacuum;

(4) then steady state sintering these shapes at a temperature of 500°–600° C. for 1 to 5 hours in a vacuum;

(5) now subjecting the sintered shapes to oxygen-nitrogen atmosphere equilibration heat treatment at 535° C. for 1 to 5 hours in an atmosphere of 1% oxygen and 99% nitrogen;

(6) and then subsequently cooling the sintered shapes.

References Cited by the Examiner

UNITED STATES PATENTS

| | | | |
|---|---|---|---|
| 2,765,385 | 10/56 | Thomsen | 252—501 |
| 2,843,914 | 7/58 | Koury | 252—501 |
| 2,908,594 | 10/59 | Briggs | 252—501 |
| 2,938,003 | 5/60 | Jacobs | 252—501 |

JULIUS GREENWALD, *Primary Examiner.*

JOSEPH R. LIBERMAN, *Examiner.*